US010208390B2

(12) United States Patent
Myung et al.

(10) Patent No.: US 10,208,390 B2
(45) Date of Patent: Feb. 19, 2019

(54) SYNTHESIS OF NANOPEAPODS BY GALVANIC DISPLACEMENT OF SEGMENTED NANOWIRES (71) Applicant: THE REGENTS OF THE UNIVERSITY OF CALIFORNIA, Oakland, CA (US)

(72) Inventors: Nosang Vincent Myung, Riverside, CA (US); Carlos Maldonado Hangarter, Gaithersburg, MD (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 587 days.

(21) Appl. No.: 14/930,247

(22) Filed: Nov. 2, 2015

(65) Prior Publication Data
US 2016/0053392 A1 Feb. 25, 2016

Related U.S. Application Data (62) Division of application No. 13/113,623, filed on May 23, 2011, now Pat. No. 9,206,039.
(Continued)

(51) Int. Cl.
C25D 1/00 (2006.01)
B82B 3/00 (2006.01)
(Continued)

(52) U.S. Cl.
CPC ............ C25D 1/006 (2013.01); B22F 1/0025 (2013.01); B82B 3/0033 (2013.01); B82Y 30/00 (2013.01);
(Continued)

(58) Field of Classification Search
None
See application file for complete search history.

(56) References Cited

U.S. PATENT DOCUMENTS 7,223,474 B1     5/2007  Shelmutt et al.
2006/0024438 A1* 2/2006  Ku .................. B82Y 30/00
                                                       427/237
(Continued)

FOREIGN PATENT DOCUMENTS

WO    2008051302 A2    5/2008
WO    20100029550 A2   3/2010

OTHER PUBLICATIONS

International Search Report and Written Opinion corresponding to PCT/US 2011/00918 dated Aug. 18, 2011.
(Continued)

Primary Examiner — Daniel J. Schleis
(74) Attorney, Agent, or Firm — Buchanan Ingersoll & Rooney PC (57) ABSTRACT A method for fabricating nanostructures and nanostructures are disclosed, which can include forming a multi-segmented nanowire; and performing a galvanic displacement reaction on the multi-segmented nanowire. The method utilizes template directed electrodeposition to fabricate nanowires with alternating layers of sacrificial/noble metal, enabling a new level of control over particle spacing, aspect ratio, and composition. Moreover, by exploiting the redox potential dependent reaction of galvanic displacement, nanopeapod materials can be extended (semiconductor/metal, p-type/n-type, metal/metal, ferromagnetic/nonmagnetic, etc.) beyond the fundamental metal/metal-oxide nanopeapods synthesized by high temperature techniques. Co/Au and Ni/Au multisegmented nanowires are disclosed, which can be create Te/Au nanopeapods by galvanic displacement, pro-
(Continued)

ducing Te nanotubes and nanowires with embedded Au particles, respectively.

18 Claims, 9 Drawing Sheets

Related U.S. Application Data (60) Provisional application No. 61/347,212, filed on May 21, 2010.

(51) Int. Cl.
*B82Y 30/00* (2011.01)
*B22F 1/00* (2006.01)
*C22C 1/04* (2006.01)
*C25D 1/04* (2006.01)
*C25D 3/12* (2006.01)
*C25D 3/48* (2006.01)
*C23C 18/54* (2006.01)
*C23C 18/16* (2006.01)
*B82Y 40/00* (2011.01)

(52) U.S. Cl.
CPC .......... *C22C 1/0433* (2013.01); *C22C 1/0466* (2013.01); *C23C 18/1635* (2013.01); *C23C 18/54* (2013.01); *C25D 1/04* (2013.01); *C25D 3/12* (2013.01); *C25D 3/48* (2013.01); *B82Y 40/00* (2013.01); *Y10T 428/12889* (2015.01)

(56) References Cited

U.S. PATENT DOCUMENTS

| | | | |
|---|---|---|---|
| 2008/0081388 A1* | 4/2008 | Yasseri | B82Y 40/00 438/22 |
| 2009/0057650 A1 | 3/2009 | Lieber et al. | |
| 2009/0155587 A1 | 6/2009 | Mirkin et al. | |
| 2009/0202644 A1 | 8/2009 | Gogotsl et al. | |
| 2010/0009338 A1* | 1/2010 | Zhang | B82Y 10/00 435/5 |
| 2011/0177683 A1 | 7/2011 | Kahen et al. | |

OTHER PUBLICATIONS

The extended European Search Report dated Oct. 8, 2014 issued in corresponding European Application No. 11783880.5.
Chang, C.H., et al. "Synthesis of Te and BixTey Nanotubes by Galvanic Displacement of Iron Group Metal Nanowires" 214th ECD Meeting, Abs. #301, The Electrochemical Society, 2008.
Nicewarner-Pena, S. R., et al. "Barcoded Metal Nanowires: Optical Rflectivity and Patterned Fluorescence" Journal of Physical Chemistry B, 2003, 107, 7360-7367.
Eom, H., et al., "Synthesis of metal-semiconductor segmented nanowire by electrodeposition", MRS vol. 1206, 1206-M16-20, Presented Boston, MA, 2009.
Xiao, F., et al., "Synthesis of Bi2Te3 Nanotubes by Galvanic Displacement", JACS 2007, 127, 10068-10069.
Haynes, W.M., et al. "CRC Handbook of Chemistry and Physics", 95th Edition, 2015.
James A. Sioss et al., "Batch Preparation of Linear Au and Ag Nanoparticle Chains via Wet Chemistry", Nano Letters, 2005, vol. 5, No. 9, pp. 1779-1783.
Session M16: Poster Session II: Metallic, Organic and Oxide Nanowires, Chairs: Anna Morral and Kornelius Nielsch, Dec. 3, 2009.
Hyeonjin Eom et al., article entitled "Synthesis of metal-semiconductor segmented nanowire by electrodeposition", Department of Materials Science and Engineering, Department of Bio Nan Technology, Hanyang Unviersity, Ansan, Kyeonggi-do, The Republic of South Korea.

* cited by examiner

SYNTHESIS OF NANOPEAPODS BY GALVANIC DISPLACEMENT OF SEGMENTED NANOWIRES

CROSS-REFERENCE TO RELATED APPLICATION

This patent application is a continuation of U.S. patent application Ser. No. 13/113,623, filed on May 23, 2011, and which claims priority to U.S. Provisional Patent Application Ser. No. 61/347,212, filed May 21, 2010, which are incorporated herein by reference in their entirety.

FIELD OF THE INVENTION

This invention relates to a method and system of synthesizing nanopeapods by galvanic displacement of segmented nanowires, and more particularly to a method and system of fabricating nanostructures by forming a multi-segmented nanowire with alternating layers of sacrificial/noble metals, and performing a galvanic displacement reaction on the multi-segmented nanowire.

BACKGROUND

Nanoengineered materials utilize diminutive features to enhance interface/surface properties and overcome limitation of conventional materials. In recent years, progress in this field has been directed towards the fabrication of complex layered nanostructures such as core/shell configurations and advanced assembly techniques for functional arrangements of nanoparticles. Both of these routes, while promising, are in the nascent stages of development largely due to the high level of accuracy and localization required when modulating composition or aligning nanomaterials. One unique structure that has recently emerged with demonstrated enhancement of optoelectronic properties and promise as precisely fabricated linear assemblages of nanoparticles for plasmon waveguides are nanoparticle embedded nanotubes or nanopeapods.

To date, nanopeapods have been fabricated by a limited number of techniques typically requiring either a microwave reactor or a nanoporous template. The former is a specific, complex method with stringent conditions and a solid husk with little evidence for dimensional control over the sheathing material or material variation. Of the template techniques there are three different approaches that have demonstrated feasibility in terms of material selection and dimensional control. The first method utilizes a template to fabricate multisegmented nanowires, which are subsequently coated by a nanometer thin porous silica shell using sol gel chemistry. The nanowire consists of alternating layers of noble/base metals (i.e. Au/Ni, Ag/Ni) allowing the more base metal to be chemically etched after the silica coating. The nanoparticle chain materials and dimensions for this process can be finely tuned since they are determined by electrodeposition of the metal segments and template pore size. The second approach employs a nanoporous alumina template or a nanowire as a template for atomic layer deposition (ALD). This process requires ALD of two metal oxide (or polymer) materials, an outer shell and inner sacrificial layer. In the case of the metal oxide template, metal nanowires are then electrodeposited into the double coated nanopores. After etching the template and sacrificial layer the intermediate structure, composed of a metal oxide nanotube partially filled with a metal nanowire, emerges. To delineate the metal nanowire into particles or rods, one can take advantage of the Rayleigh instabilities during the annealing process. The procedure is more general with greater material variety of the shell (metal oxides or polymer). The last technique also relies on electrodeposition to generate base/noble metal multilayered nanowires within an alumina template, but solid state reaction differentiates their approach from others. The solid state reaction creates a new tube material by diffusion of the base metal into the alumina template, where Kirkendall effects create the void spaces between the noble nanoparticles.

However, all of the previously described methodologies suffer from one common limitation; the inability to fabricate nanoparticle and shell structures from materials such as metal/semiconductor, p-type/n-type semiconductor, metal/metal, metal oxide/metal oxide, or ferromagnetic/nonmagnetic. Accordingly, it would be desirable to fabricate nanoparticle and shell structures from materials such as metal/semiconductor, p-type/n-type semiconductor, metal/metal, metal oxide/metal oxide, or ferromagnetic/nonmagnetic and introduce these fabricated nanoparticles and shell structures into a host of fundamentally important studies with applicability to thermoelectric materials, spintronics, nanosensors, and plasmonics. Additionally, it would be desirable to modulate nanowire/nanotube structures of the same composition offer an efficient route to study confinement effects within nanotubes.

SUMMARY

In accordance with an exemplary embodiment, a *facile* technique to fabricate one-dimensional semiconductor nanostructures with precisely positioned embedded metal nanoparticles, termed nanopeapods, is disclosed herein. These engineered nanostructures have demonstrated enhanced photosensitivity in previous reports and have projected application as plasmon waveguides. One of the novel aspects of this process is the use of electrodeposited multi-segmented nanowires with galvanic displacement reaction to create such nanopeapods. This approach utilizes template directed electrodeposition to fabricate nanowires with alternating layers of sacrificial/noble metal, enabling a new level of control over particle spacing, aspect ratio, and composition. Moreover, by exploiting the redox potential dependent reaction of galvanic displacement, nanopeapod materials can be extended (semiconductor/metal, p-type/n-type, metal/metal, ferromagnetic/nonmagnetic, etc.) beyond the fundamental metal/metal-oxide nanopeapods synthesized by high temperature techniques.

In accordance with an exemplary embodiment, Co/Au and Ni/Au multisegmented nanowires were used to create Te/Au nanopeapods by galvanic displacement, producing Te nanotubes and nanowires with embedded Au particles, respectively. It can be appreciated that different nanowire diameters and segment lengths are embodied, which demonstrates nanoscale precision In accordance with an exemplary embodiment, a method for fabricating nanostructures, comprises the steps of: forming a multi-segmented nanowire; and performing a galvanic displacement reaction on the multi-segmented nanowire.

In accordance with another exemplary embodiment, a nanostructure produced by the process of forming a multi-segmented nanowire and performing a galvanic displacement reaction on the multi-segmented nanowire.

The details of one or more embodiments of the disclosure are set forth in the accompanying drawings and the description below. Other features, objects, and advantages will be apparent from the description and drawings, and from the claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

In accordance with an exemplary embodiment, a system and method of galvanic displacement of electrodeposited multisegmented nanowires can be obtained as a simple and scalable method to achieve such nanopeapod structures. This procedure utilizes template directed electrodeposition to fabricate multilayer nanowires, providing the spacing precision of electrodeposition. Since no heat treatment is required for this process, the embedded particles can range from very thin discs to nanorods. Additionally, it can be appreciated that more exotic nanopeapod materials are feasible (oxidizable metals, semiconductors, etc.) for galvanic displacement reaction, which depends on half reaction potentials of the nanowire segments and material to be deposited.

In accordance with an exemplary embodiment, Te (Tellurium) nanotubes with embedded Au (Gold) nanoparticles and Te nanowires with embedded Au nanoparticles were fabricated by galvanic displacement reactions. In accordance with an exemplary embodiment, the procedure for fabricating nanopeapods follows that previously described for synthesizing $Bi_2Te_3$ nanotubes, but utilizes a segmented sacrificial wire with an alternating sequence containing a base element for displacement and a more noble element that remains after the displacement reaction. The segmented nanowires were synthesized by template directed electrodeposition, a method pioneered by Martin and Moskovitz, which uses a nanoporous template to confine electrodeposited material radially and the deposition condition to control the axial length of the nanowire. To start, alumina (Whatman Anodisk 13) templates and polycarbonate membranes (Nucleopore 30 nm and 50 nm) were sputtered with Au on one side using an EMS KX550 sputter coater. It can be appreciated that the sputtered Au acts as a seed layer for electrodeposition to proceed upon. In accordance with an exemplary embodiment, alternating layers of Co/Au and Ni/Au can be electrodeposited as a dual bath method at different diameters and lengths. After electrodeposition the nanowires were harvested using 1M NaOH at room temperature to etch alumina templates and 1-methyl-2-pyrrolidinone at 50° C. to dissolve polycarbonate membranes for eight hours each. The nanowires were washed three times by centrifuging or settling, extracting the solvent and the addition of nanopure water (Millipore A). Portions of nanowire batches were successively transferred to isopropyl alcohol (IPA) by a similar sequence of washings.

In accordance with an exemplary embodiment, nanowire electrodepositions were carried out in 100 mL electrochemical cells with a three electrode configuration using a saturated calomel electrode (SCE) as a reference electrode. The Cobalt (Co) electrolyte consisted of 1.0M $CoCl_2$+1.0M $CaCl_2$ at a pH of 4.0. Cobalt (Co) electrodeposition was performed galvanostatically, −10 mA/cm², and potentiostatically, −0.96V (vs. SCE), at room temperature with no agitation. The Au segments were electrodeposited from a sulfite-based commercial Technic bath, 25 RTU-ES, containing 40 mM of Au at a potential of −0.5V (vs. SCE) or a current density of −1 mA/cm$^2$ and a temperature of 50° C. with agitation from a 1 inch stir bar at 300 revolutions per minute.

Synthesis of Ni/Au nanowires followed the same protocol as that of Co/Au nanowire synthesis. The Co electrolyte was simply substituted with a Ni electrodeposition bath. The composition of the bath was 1.5M Ni(NO$_2$SO$_3$)$_2$+0.4M H$_3$BO$_3$+0.2M NiCl$_2$ at pH 4.0. H$_3$BO$_3$ was added as a buffer and NiCl$_2$ was used to enhance anode dissolution. Ni was electrodeposited galvanostatically at −10 mA/cm$^2$ in a two electrode configuration with a Ni counter electrode for alumina templates and potentiostatically in a three electrode configuration at −0.96 vs. SCE for polycarbonate templates.

Galvanic displacement reactions were performed on both substrate bound nanowires and suspended nanowires. The substrate bound nanowires employed Co/Au and Ni/Au multisegmented nanowires suspended in IPA, as the solvent evaporated quickly and provided good nanowire dispersion. The nanowires were cast on Si substrates (0.25 cm$^2$) and allowed to dry. The substrate bound nanowires were then submerged in 10 μL of the nitric acid Te solution, 1M HNO$_3$+10 mM TeO$_2$, for 30 minutes. Following the displacement reaction, the solution was carefully wicked with a KimWipe and washed with a sequence of 10 μL droplet of nanopure water on the substrate and wicking, three times each. Nanowires suspended in nanopure water were used for galvanic displacement in solution. 10 μL of the nanowire suspension was drawn and then dispensed in 1 ml of the Te solution. The nanowires were immediately shaken to prevent agitation and to set aside for 30 minutes before washing three times with nanopure water. SEM micrographs were taken with a Phillips XL30 FEG SEM and LEO Supra 55 SEM. TEM micrographs were taken on C coated Cu grids with a FEI Phillips CM300 TEM.

It can be appreciated that galvanic displacement reaction has been previously utilized to create a wide variety of metal nanoshells or nano structures with hollow interiors. This process was later adopted to yield multi-walled metal nanoshells with shells of different metal composition. It can be appreciated that galvanic displacement reactions has been extended to generate semiconductor and compound semiconductor nanotubes from ferromagnetic nanowires. However, to date galvanic displacement has not been implemented with segmented bimetallic nanowires or to create metal/semiconductor nanostructures, wherein one metal component is displaced by a semiconductor material and the other is retained. Thus, methodical incorporation of semiconductor nanomaterials with prearranged bimetallic nanowires is a critical step, drastically augmenting the utility of galvanic displacement of nanostructures.

The driving force for galvanic displacement reactions is the difference in redox potentials, a fundamental electrochemical process. The mechanism for creating hollow nanostructure by galvanic displacement reactions starts with particle nucleation and growth of the more noble material on the surface of the sacrificial metal nanostructure, forming a thin, porous sheath. As the shell fills in, diffusion across the casing allows for continued oxidation/dissolution of the sacrificial metal. The end result is a hollow nanostructure with an interior roughly resembling the exterior of the sacrificial metal.

Figure 1:
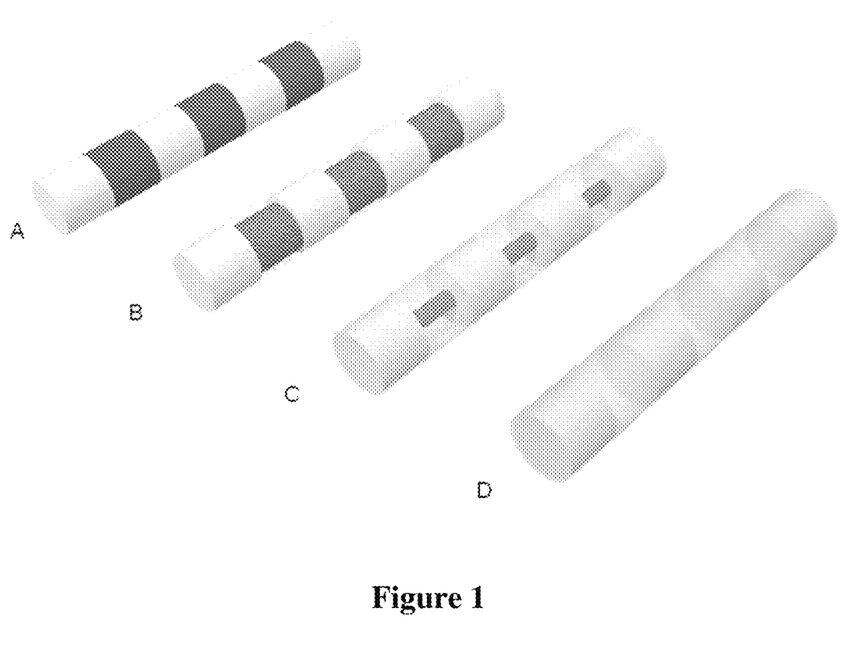
FIG. 1 shows a schematic of galvanic displacement reaction progression for Co/Au multisegmented nanowires, wherein (A) shows the as synthesized Co/Au (Cobalt/Gold) nanowire is (B) sheathed in a thin porous Te (Tellurium) coating (C) that permits continued dissolution of the Co segments as the Te coating continues to grow, (D) until the Te tube with embedded Au particles is all that remains.
Figure 2:
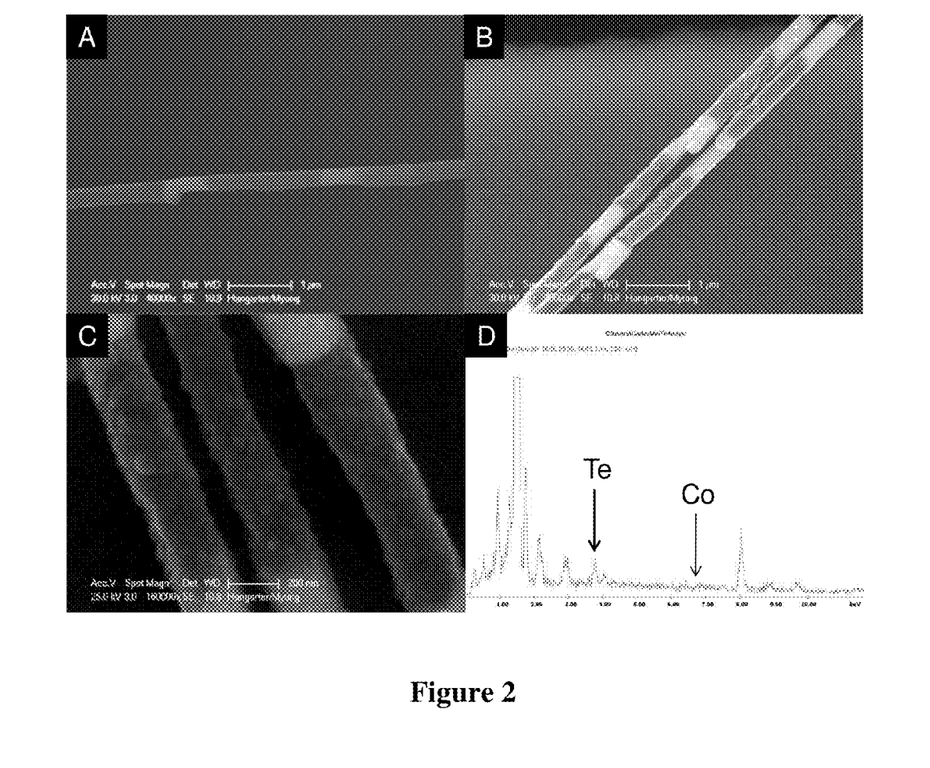
FIG. 2 shows SEM (scanning electron microscope) images of (A) electrodeposited Co/Au multisegmented nanowires and (B, C) the corresponding Au/Te nanopeapod structure synthesized by galvanic displacement, and wherein (D) the EDX spectrum of image (C) indicates the presence of Te and no detectable concentration of Co, and additional peaks pertain to the Au segments, 2.12 keV, and substrate materials, Cu 8.04 keV and Al 1.48 keV.

The procedure, as applied to the Co/Au multilayered nanowire system, is shown in FIG. 1. In these experiments Te coats the Au segments as it encapsulated the volume of the pre-existing Co segment. This feature is a result of the difference in electrode potentials of each metal in the bimetallic nanowire. As a consequence, Co/Au bilayers also behave as conjoined electrodes of an electrochemical cell, with Au as a cathode for Te deposition and Co as the dissolving anode. SEM images of the Co/Au nanowires and the Au particle embedded Te nanotube are shown in FIGS. 2A and 2B. The segments of the Co/Au nanowire are shown to be approximately 2 μm and approximately 1 μm, respectively. A distinct change in morphology after displacement indicates the entire structure has been coated. The rough surface of the Te tube with the globular appearance at high magnification in FIG. 2C may be a consequence of surface roughness from the Co oxide layer or even the initial porosity that is enables continued dissolution of the Co across the Te shell. However, similar morphological coatings on the Au segments suggest it may also be a result of the growth mechanism, which is likely due to low nucleation and surface mobility, typical factors causing botryoidal deposits. It can be appreciated that in accordance with an exemplary embodiment, by increasing the temperature it may provide a means to improve crystallinity. The transparency of the Te allows the Au segments to be visually located with SEM and reveals a fairly consistent outer diameter for the Te nanotube, especially for coatings over the Au segments. The displacement of Co by Te after the galvanic displacement reaction was verified by energy dispersive X-ray spectroscopy (EDX). The EDX spectrum in FIG. 2D clearly indicates the absence of Co and the appearance of Te.

Figure 3:
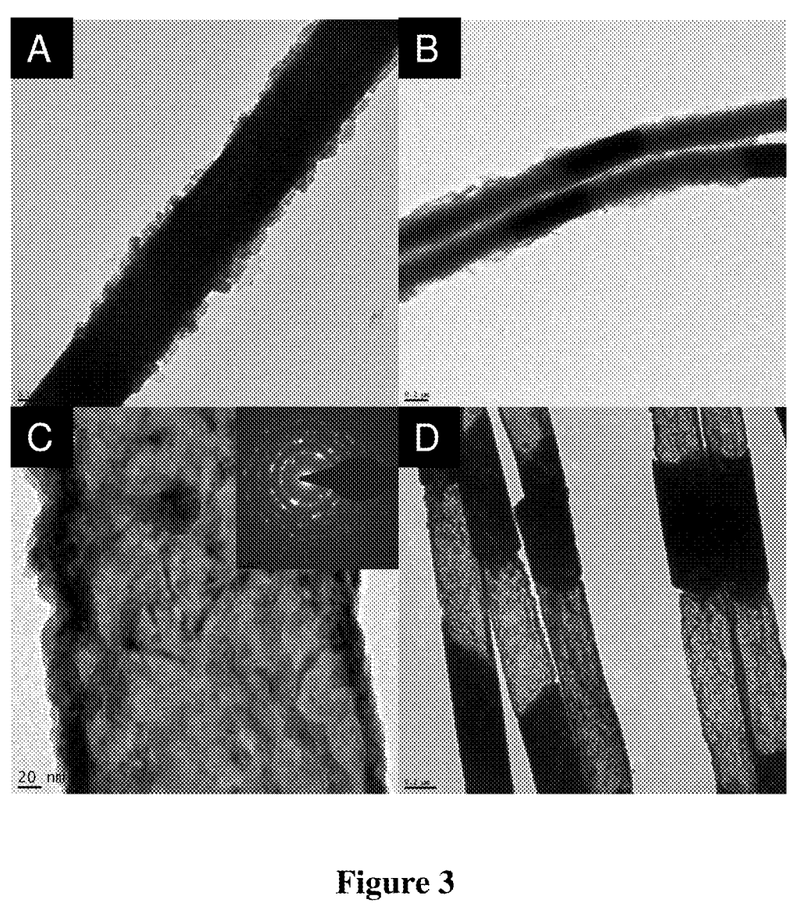
FIG. 3 shows TEM (transmission electron microscopy) images of (A-B) Co/Au multisegmented nanowires and (C-D) Te/Au nanopeapods, and wherein EDX (Energy-dispersive X-ray spectroscopy) and SAED (Selected area (electron) diffraction) patterns for Co/Au nanowires (E-F) before and after (G-H) galvanic displacement are also shown, and wherein scale bars are as follows: 20 nm and 200 nm for (C) and (A, B, D), respectively.

The TEM images in FIG. 3 reveal the solid wire and tube cross section. The Co/Au nanowires can be clearly differentiated in FIG. 3B, with the Co segments approximately 2 μm in length and the Au segments, darker in color, are approximately (~) 1 μm in length. The thick, fragmented oxide layer on Co gives the appearance of a hairy nanowire. The enlarged image the Te tube segment, after displacement, reveals the granular structure, with small grains. The structure of the Te coating was verified by selected area diffraction pattern (FIG. 3C inset), revealing a polycrystalline structure in agreement with similar results. Although polycrystalline in nature, previous demonstrations of refluxing at elevated temperatures may improve the crystallinity, in accord with the observed microstructure. Additionally, the wall thickness ranges from approximately 10 nm to approximately 27 nm with an inner diameter of approximately 225 nm to approximately 250 nm. It can be appreciated that in accordance with an exemplary embodiment, the variation in tube diameter may be attributed to poor Co/Au interfaces, likely due to oxidation between depositions as a result of rinsing with water, or uneven Co surfaces due to template imperfections. It can be appreciated that interfacial quality can be ameliorated by selection of an acid Au bath or a single bath with pulsed electrodeposition.

Figure 4:
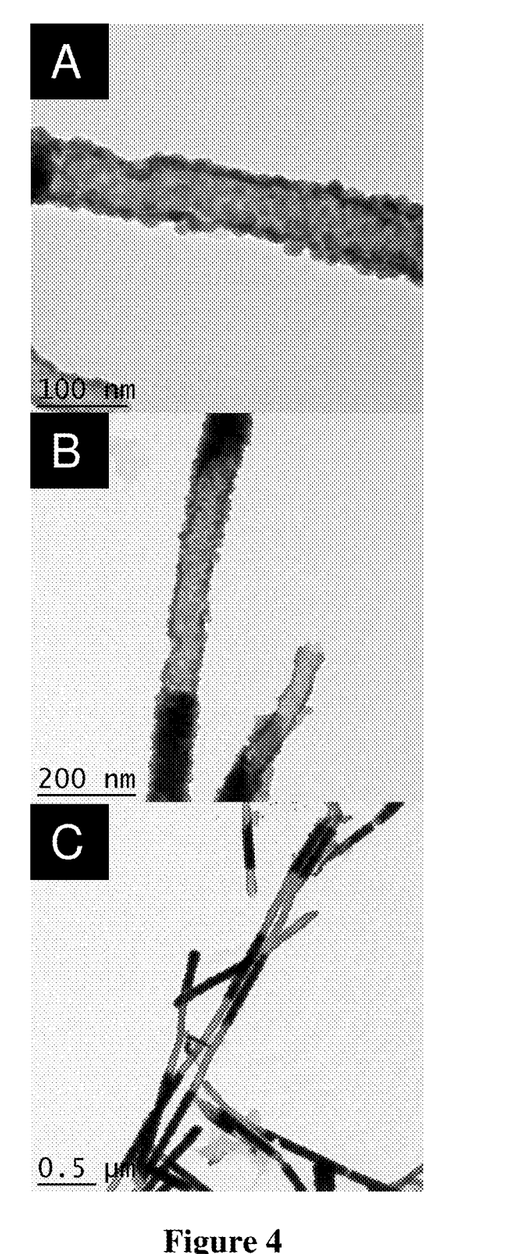
FIG. 4 shows TEM images of Au/Te nanopeapods produced from a 30 nm polycarbonate template.

In accordance with another exemplary embodiment, smaller Au/Te nanopeapod structures can also be fabricated from polycarbonate templates. Although the nominal pore size of these templates was 30 nm the Au segments are shown to have a diameter of approximately 65 nm. The wall thickness of the Te tube in FIG. 4A is measured to be approximately 12.5 nm with an outer diameter of 75 nm, indicating a slight contractions from the original Co segment diameter. It can be appreciated that this contraction is likely a consequence of the larger aspect ratio of the sacrificial Co segment, which is double that of the alumina template Co segment, permitting slight tube collapse prior to filling in. The decrease in wall thickness from the larger diameter Te/Au nanopeapod is in accord with the reduced volume of the sacrificial Co. Additionally, the Te tube has a much more pronounced botryoidal microstructure, which also appears on the Au segment.

In contrast to Co/Au, Ni/Au multisegmented nanowires produced distinctly different nanopeapods. It can be appreciated that the mechanistic nanopeapod formation described in FIG. 1 does not apply to nanopeapods formed from Ni/Au nanowires. The structure of these nanopeapods is a Te nanowire with embedded Au segments. The mechanism for nanowire, as opposed to a tube (or tubular structure), formation between Au segments is likely due to the more positive electrode potential of Ni, with respect to Co, slowing down the displacement kinetics and reducing electron transfer between the bimetallic Ni/Au electrode junctions. This shift in potential can also provide kinetic favorability for etching or displacement along grain boundaries, which would allow progressive contraction of the Te deposit as the Ni is displaced.

Figure 5:
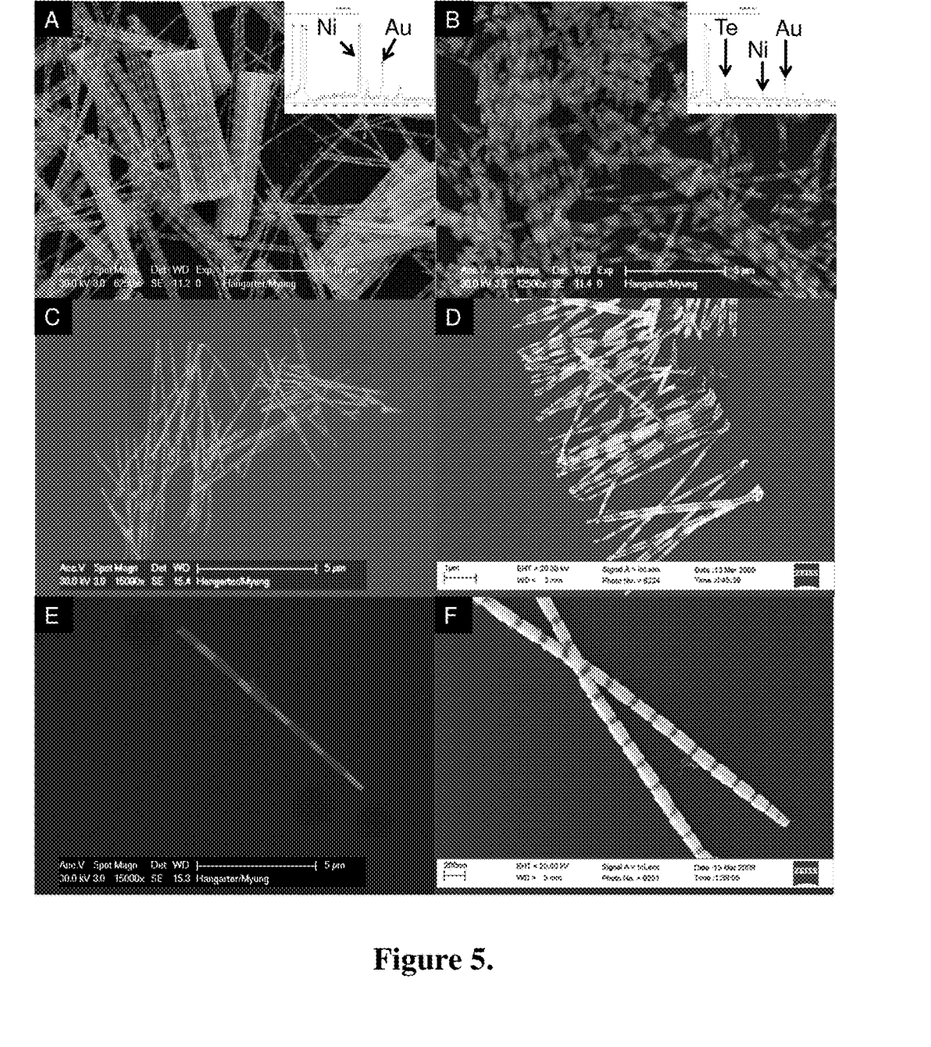
FIG. 5 shows SEM images of Ni/Au nanowires fabricated from (A) 200 nm alumina templates and (C) 30 nm polycarbonate membranes, and wherein the coated structures after galvanic displacement are shown in (B) and (D) for alumina and polycarbonate, respectively, and the insets of (A-B) are EDX patterns for their corresponding images, (E-F) SEM images of (E) 200 nm Ni/Au and (F) 50 nm galvanically displaced Ni/Au nanowires with different segment lengths, and wherein scale bars are as follows: (A) 10 µm, (B-C, E) 5 µm, (D) 1 µm, and (F) 0.2 µm.
Figure 6:
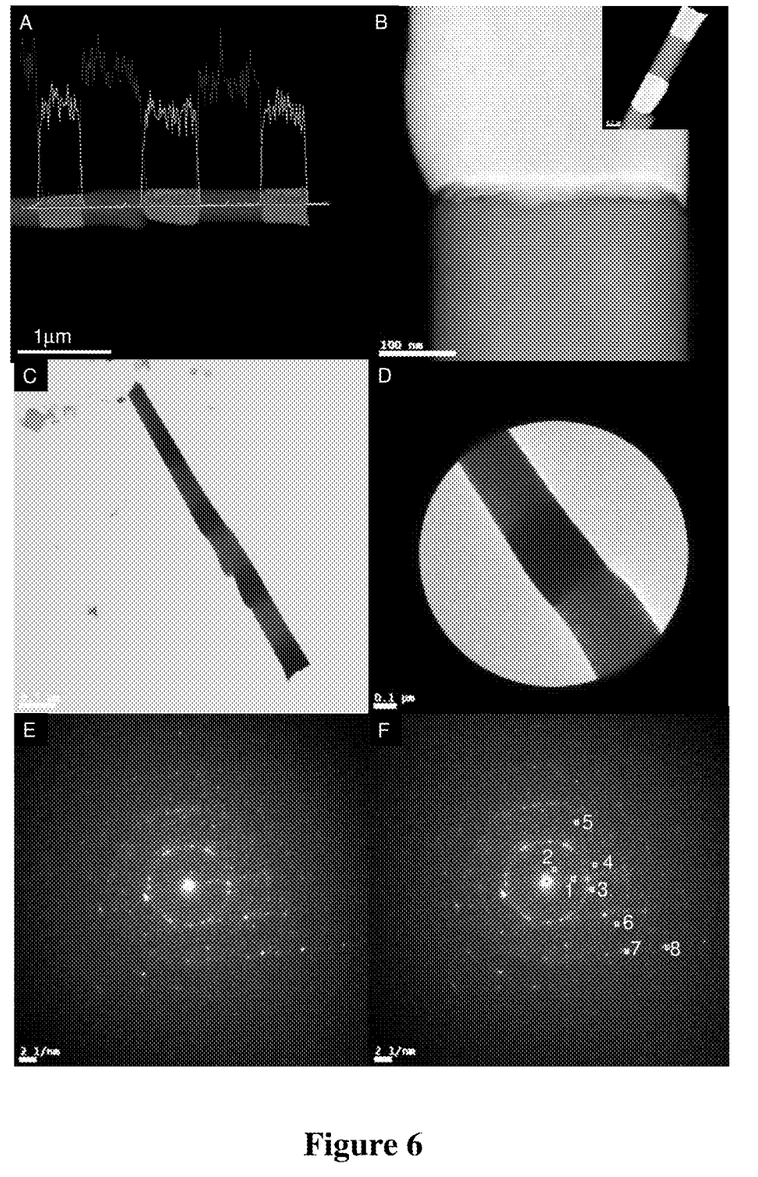
FIG. 6 shows (A-B) Darkfield and (C-D) brightfield TEM images of Ni/Au nanowires, wherein (A) the EDX line scan confirms segment contrast for (red) Ni and (blue) Au, (D) the brightfield TEM images corresponds to the (E-F) SAED patterns below, and wherein the scale bars are as follows: (A) 1 µm, (C) 0.5 µm, and (B, D) 0.1 µm.

Representative SEM images of the Ni/Au multisegmented nanowires are shown in FIG. 5. Numerous variations of the Ni and Au segment lengths were investigated for both alumina and polycarbonate templates. EDX analysis of Ni/Au nanowires before galvanic displacement in FIG. 5A indicate strong peaks for both elements. After galvanic displacement, FIG. 5B, the Ni peak is drastically reduced and Te appears. Additional Ni/Au nanowires with different diameter and segment lengths are shown in FIGS. 5B-5D. TEM images with EDX line scans and selected area electron diffraction patterns of 200 nm Ni/Au nanowires are shown in FIG. 6. The EDX line scan clearly shows the delineation of the segments. In FIG. 6B a compromised interface, presumable resulting from Au electrodeposition on Ni, is shown. This weaker junction alternates, as shown by the inset, with every other interface, consistent with pH induced oxidation or etching of Ni during Au electrodeposition. The SAED patterns of a single nanowire and selected area show the polycrystalline structure of the Au/Ni segments, consistent with previous reports of Ni and Au nanowires electrodeposited from a sulfamate and sulfite bath, respectively. The corresponding d-spacing values and orientations for FIG. 6F are shown in Table 1. The Au segments have plane spacings of (100), (200) and (422) with unit cell edge lengths, calculated for Au as a face centered cubic structure, of 3.810, 4.092, and 4.025 Å, respectively. These values are reasonably close to the JCPDS value of 4.0786 Å. The Ni plane spacings appearing from the SAED patterns are (111), (200), (220), (311), and (440), with a=3.527, 3.564, 3.623, 3.588, and 3.568 Å, which also lie close to the literature value a=3.5238 Å.

Figure 7:
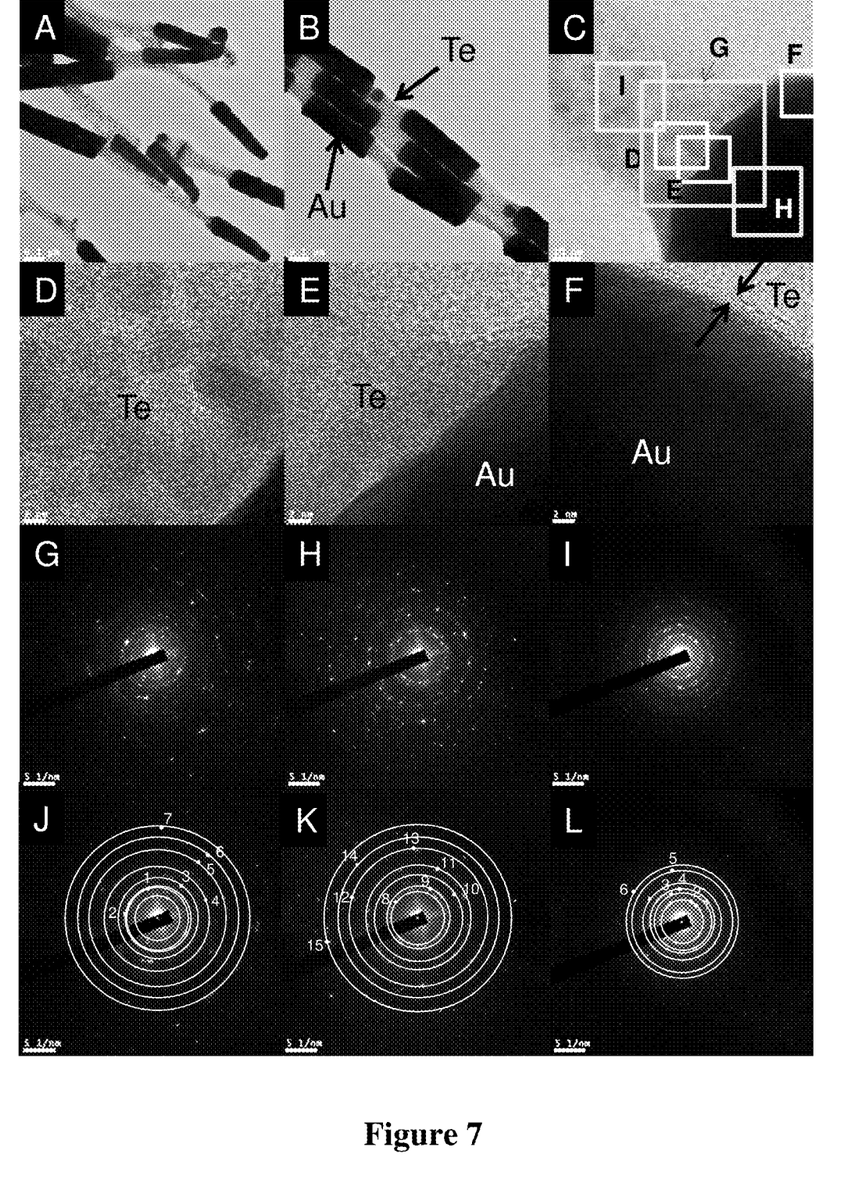
FIG. 7 shows (A-F) Brightfield TEM images of Ni/Au multisegmented nanowires synthesized from a 50 nm polycarbonate template after galvanic displacement, the boxes in (C) correspond to the images in (D-F) and SAED patterns in (G-I), and the SAED patterns (J), (K), and (L) are the exact same SAED patterns as (G), (H), and (I), respectively, with numbered spots and corresponding white rings for d-spacing values in Table 2 and 3, and wherein the scale bars are as follows: (A-B) 100 nm, (C) 10 nm, and (D-F) 2 nm.
Figure 8:
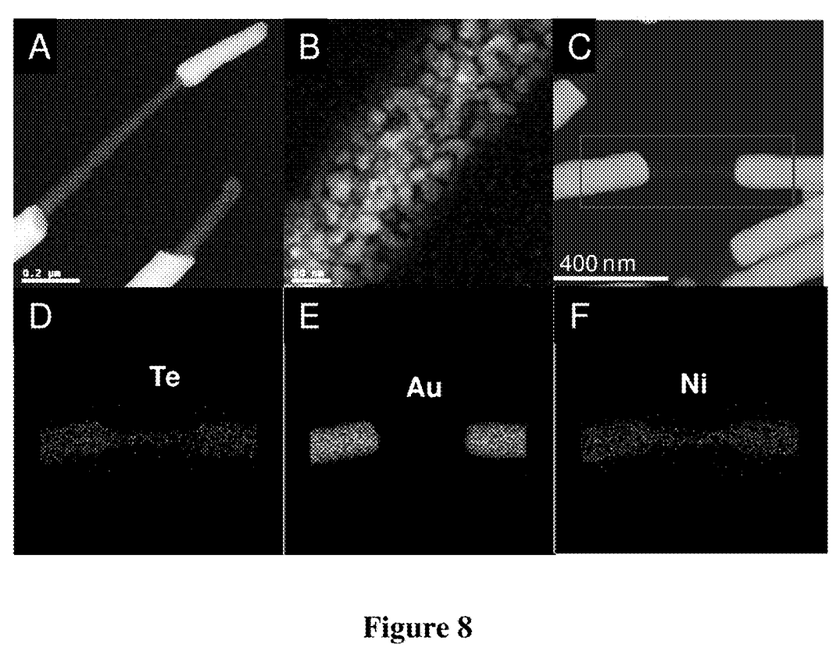
FIG. 8 shows (A-C) Darkfield TEM images of Ni/Au nanowires fabricated with 50 nm polycarbonate templates and subjected to galvanic displacement reaction with Te, and wherein the box in (C) indicates the area of the EDX mapping for (D) Te, (E) Au, and (F) Ni, and wherein scale bars are as follows: (A) 0.2 µm, (B) 20 nm, and (C) 400 nm.

TEM results for galvanic displacement reaction of Ni/Au nanowires grown from 50 nm polycarbonate templates are shown to be approximately 115 nm in diameter (FIG. 7). The Ni appears to be etched to near completion being replaced with granular Te segments. Lattice fringes from high magnification TEM images of the Te/Au interface reveal the Te granules to be as large as 6 nm. SAED patterns suggest a mixed polycrystalline/amorphous structure and small grain sizes for the Te segment with d-spacings for FIG. 7L shown in FIG. 7I and given by Table 2 with their respective a values. The large deviation in a, given in Å in all tables, from the literature value of 4.4579 Å suggests considerable defects or impurities and is confirms the suspected partial amorphous structure. The gold segments display a predominately polycrystalline structure with larger grains relative to Te, as depicted by FIGS. 7H-7I. Contrary to larger Ni/Au multisegmented nanowires, these samples displayed minimal Te deposition on the Au segments. However, the Te top-coat may have contributed to the stronger deviations in a values from those reported for as synthesized Ni/Au nanowires (Table 3). Darkfield images of these nanowires also highlight the granular structure of the Te segments and lack of tubular structure (FIG. 8). The EDX area scans of one such Te segment depicts that Te is uniformly mapped over all segments along with Ni (Nickel). The high concentration of Ni, $Ni_{0.441}Te_{0.559}$ by EDX, is an important factor contributing to the plane spacing deviations and suggest the formation of intermetallic NiTe, which is thermodynamically more favorable to Ni and Te (FIGS. 8D-8F). The corresponding NiTe planes and a values for FIG. 8I are shown in Table 4. Some d-spacing values produce better lattice edge length fittings to NiTe (a=3.9293 Å) than Te.

Figure 9:
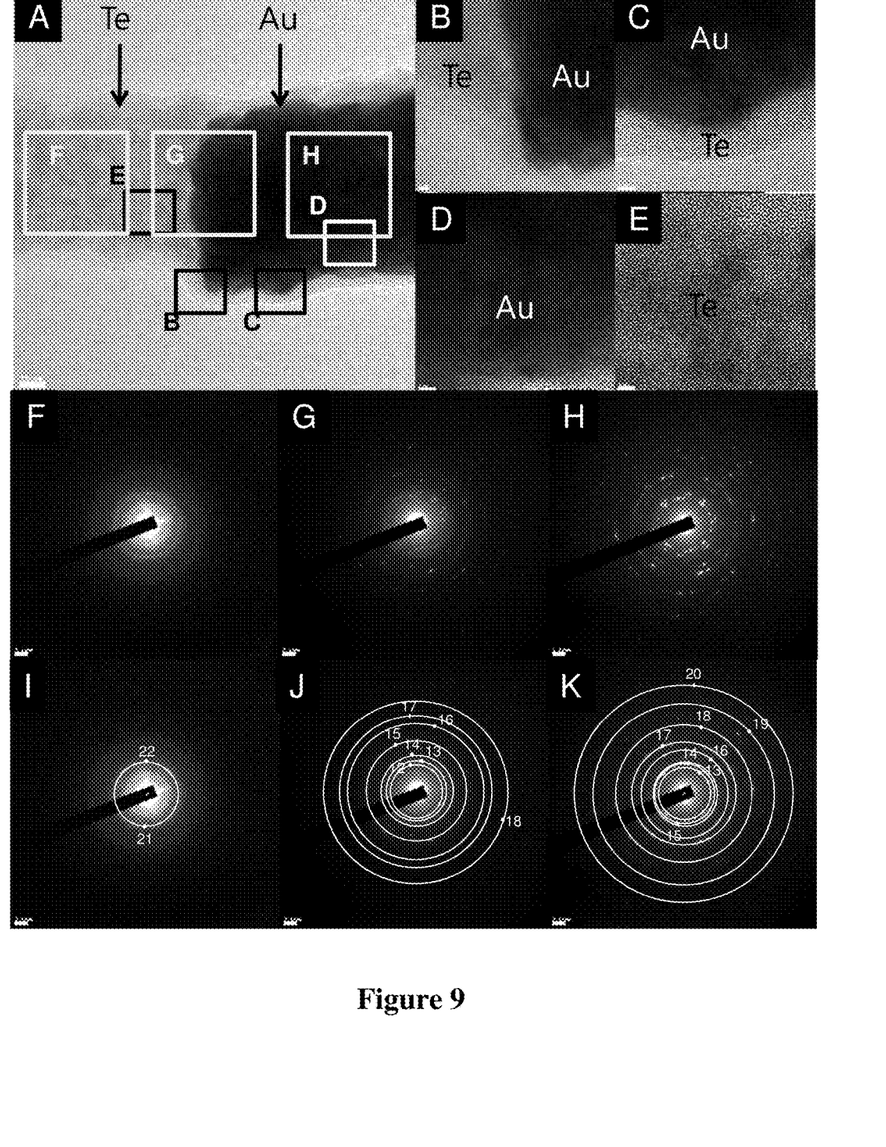
FIG. 9 shows (A-E) Brightfield TEM images of Ni/Au multisegmented nanowires from 30 nm polycarbonate template after galvanic displacement, and wherein the boxes in (A) correspond to the images in (B-E) and SAED patterns in (F-K), the SAED patterns (I), (J), and (K) are the exact same SAED patterns as (F), (G), and (H) respectively, with numbered spots and corresponding white rings for d-spacing values from Tables 4 and 5, and wherein the scale bars are as follows: (A) 10 nm and (B-E) 2 nm.

The TEM images for nanowires fabricated from 30 nm polycarbonate membranes show the actual nanowire diameter to be approximately (~) 75 nm. The Te/Au interface of a Ni/Au nanowire subjected to galvanic displacement reaction is shown in FIG. 9. These wires appear very similar to those fabricated from 50 nm polycarbonate membranes. The high magnification TEM images show a granular structure for the Te but with comparably smaller and less lattice fringes, which agrees with the nearly amorphous SAED pattern. The Te coating on the Au is also more pronounced on these wires with thickness from 2-6 nm. Although the SAED pattern is nearly amorphous, two points are distinguishable and have been assigned planes of (200) with very good lattice edge length fittings to both Te and NiTe (Table 5 and 6), however the intensity values for the NiTe plane spacing is much stronger than the Te. This supports the possibility of NiTe intermetallic formation, but is difficult to confirm by SAED pattern alone. The SAED pattern for the Au segments on these nanowires is similar to that of the previous nanowire, with good fitting lattice edge values except for a couple spots that can be attributed to the Te coating (Table 7).

In accordance with another embodiment, a different approach was investigated for the synthesis of nanopeapods, with one material discontinuously embedded within the core of a different material. This technique utilized template directed electrodeposition to fabricate a multisegmented nanowire of Co/Au, where Co serves as the sacrificial metal for galvanic displacement and Au becomes encapsulated by the Te coating. The Te coating over the Au was attributed to the difference in electrode potentials of the Co and Au, allowing Au to mediate charge transfer from Co to $HTeO_2^+$. The displacement reaction was demonstrated with both alumina and polycarbonate template fabricated nanowires. SEM images revealed a botryoidal microstructure, which was also shown by TEM and attributed to low nucleation and surface mobility. The wall thickness of the nanopeapods was dependent on the quantity of sacrificial Co, decreasing from approximately 20 nm to approximately 12.5 nm as the initial diameter of the sacrificial Co segments decreased from 225 nm to 65 nm. The smaller diameter nanopeapods exhibited slight contraction of their tube segments, probably resulting from the increased aspect ratio. Utilizing Ni sacrificial segments in a Ni/Au bilayer nanowire configuration produced Te nanowires with embedded Au segments. The different structure was attributed to the difference in electrode potentials of Co and Ni. Furthermore, EDX and SAED patterns supported intermetallic NiTe formation as opposed to elemental Te. Finally, this approach is believed to be a more general route to nanopeapod synthesis as numerous template directed electrodeposition materials can be incorporated, including conducting polymers, magnetic materials, metal oxides, and compound semiconductors.

It will be understood that the foregoing description is of the preferred embodiments, and is, therefore, merely representative of the article and methods of manufacturing the same. It can be appreciated that many variations and modifications of the different embodiments in light of the above teachings will be readily apparent to those skilled in the art. Accordingly, the exemplary embodiments, as well as alternative embodiments, may be made without departing from the spirit and scope of the articles and methods as set forth in the attached claims.

TABLE 1

D-spacing values for the numbered spots from FIG. 6 (F) and corresponding element, plane, and unit cell edge length (a).

| Spot | d-spacing (nm) | Element | Plane | a |
|---|---|---|---|---|
| 1 | 0.3818 | Au | 100 | 3.818 |
| 2 | 0.6116 | Ni | 111 | 3.527 |
| 3 | 0.2046 | Au | 200 | 4.092 |
| 4 | 0.1782 | Ni | 200 | 3.564 |
| 5 | 0.1281 | Ni | 220 | 3.623 |
| 6 | 0.1082 | Ni | 311 | 3.588 |
| 7 | 0.08216 | Au | 422 | 4.025 |
| 8 | 0.06308 | Ni | 440 | 3.568 |

TABLE 2

D-spacing, plane and unit cell edge length for Te from FIG. 7 (I, L).

| Spot | d-spacing (nm) | Plane | a |
|---|---|---|---|
| 1 | 0.2795 | 101 | 3.659883 |
| 2 | 0.2792 | 101 | 3.654834 |
| 3 | 0.2148 | 111 | 4.609348 |
| 4 | 0.1947 | 003 | 0 |
| 5 | 0.1605 | 202 | 4.409229 |
| 6 | 0.1211 | 114 | 4.203072 |
| 7 | 0.1138 | 105 | 4.693809 |

TABLE 3

D-spacing, plane and unit cell edge length for Au from FIG. 8 (H, K).

| Spot | d-spacing (nm) | Plane | a |
|---|---|---|---|
| 8 | 0.2657 | 111 | 4.600 |
| 9 | 0.1926 | 200 | 3.852 |
| 10 | 0.1348 | 220 | 3.812 |
| 11 | 0.1191 | 222 | 4.126 |
| 12 | 0.09891 | 331 | 4.311 |
| 13 | 0.09266 | 420 | 4.146 |
| 14 | 0.08230 | 422 | 4.032 |
| 15 | 0.07045 | 440 | 3.988 |

TABLE 4

D-spacing, plane and unit cell edge length for NiTe from FIG. 8 (I, L).

| Spot | d-spacing (nm) | Plane | a |
|---|---|---|---|
| 1 | 0.2795 | 101 | 3.780839 |
| 2 | 0.2792 | 101 | 3.775273 |
| 3 | 0.2148 | 102 | 4.139732 |
| 4 | 0.1947 | 110 | 3.894 |
| 5 | 0.1605 | 201 | 3.884438 |
| 6 | 0.1211 | 203 | 3.800304 |
| 7 | 0.1138 | 300 | 3.942148 |

TABLE 5

D-spacing, plane and unit cell edge length for Te from FIG. 10 (I).

| Spot | d-spacing (nm) | Plane | a |
|---|---|---|---|
| 21 | 0.1940 | 200 | 4.4802 |
| 22 | 0.1943 | 200 | 4.4871 |

TABLE 6

D-spacing, plane and unit cell edge length for NiTe from FIG. 10 (I).

| Spot | d-spacing (nm) | Plane | a |
|---|---|---|---|
| 21 | 0.1940 | 110 | 3.88 |
| 22 | 0.1943 | 110 | 3.886 |

TABLE 7

D-spacing, plane and unit cell edge length for Au from FIG. 10 (K).

| Spot | d-spacing (nm) | Plane | a |
|---|---|---|---|
| 13 | 0.2304 | 111 | 3.990 |
| 14 | 0.2099 | 200 | 4.198 |
| 15 | 0.1932 | 200 | 3.864 |
| 16 | 0.1422 | 220 | 4.022 |
| 17 | 0.1252 | 311 | 4.152 |
| 18 | 0.09215 | 420 | 4.121 |
| 19 | 0.06839 | 440 | 3.868 |
| 20 | 0.05749 | 444 | 3.983 |

What is claimed is:

1. A nanostructure obtainable by a process of forming a multi-segmented nanowire and performing a galvanic displacement reaction on the multi-segmented nanowire, the nanostructure comprising:
    alternating layers of sacrificial metals and noble metals, the sacrificial metals being dissolved by the galvanic displacement reaction on the multi-segmented nanowire in a tellurium (Te) solution); and
    thereby forming a tellurium (Te) tube with embedded noble metals, wherein the embedded noble metals are in a spaced apart relationship within a coating of tellurium, and wherein the coating of tellurium coats the embedded noble metals and encapsulated at least a volume of the sacrificial metal, which has been dissolved.

2. The nanostructure of claim 1, wherein the nanostructure is a semiconductor.

3. The nanostructure of claim 1, wherein the nanostructure is a semiconductor nanotube.

4. The nanostructure of claim 1, wherein the multi-segmented nanowire is formed by template directed electrodeposition.

5. The nanostructure of claim 1, wherein the multi-segmented nanowire is comprised of alternating layers of Co (Cobalt) and Au (Gold).

6. The nanostructure of claim 1, wherein the multi-segmented nanowire is comprised of alternating layers of Ni (Nickel) and Au (Gold).

7. The nanostructure of claim 1, wherein the multi-segmented nanowire is a substrate bound nanowire.

8. The nanostructure of claim 1, wherein the multi-segmented nanowire is suspended in isopropyl alcohol (IPA)

to provide dispersion, and then the multi-segmented nanowire is submerged in the tellurium (Te) solution.

9. The nanostructure of claim 1, wherein the multi-segmented nanowire is comprised of alternating layers of Co (Cobalt) and Au (Gold), and the Co (Cobalt) serves as the sacrificial metal for galvanic displacement and the Au (Gold) becomes encapsulated by the coating of tellurium.

10. The nanostructure of claim 1, wherein the multi-segmented nanowire is comprised of alternating layers of Co (Gold) and Au (Gold), and the Co (Cobalt) serves as the sacrificial metal for the galvanic displacement reaction and the Au (Gold) becomes encapsulated by the coating of tellurium (Te).

11. A nanostructure obtainable by a process of forming a multi-segmented nanowire and performing a galvanic displacement reaction on the multi-segmented nanowire, wherein the multi-segmented nanowire includes alternating layers of sacrificial metals and noble metals, the sacrificial metals being dissolved by the galvanic displacement reaction on the multi-segmented nanowire in a tellurium (Te) solution), the nanostructure comprising:
a tellurium (Te) tube with embedded noble metals, wherein the embedded noble metals are in a spaced apart relationship within a coating of tellurium, and wherein the coating of tellurium coats the embedded noble metals and encapsulated at least a volume of the sacrificial metal, which has been dissolved.

12. The nanostructure of claim 11, wherein the nanostructure is a semiconductor.

13. The nanostructure of claim 11, wherein the nanostructure is a semiconductor nanotube.

14. The nanostructure of claim 11, wherein the multi-segmented nanowire is comprised of alternating layers of Co (Cobalt) and Au (Gold).

15. The nanostructure of claim 11, wherein the multi-segmented nanowire is comprised of alternating layers of Ni (Nickel) and Au (Gold).

16. The nanostructure of claim 11, wherein the multi-segmented nanowire is a substrate bound nanowire.

17. The nanostructure of claim 11, wherein the multi-segmented nanowire is comprised of alternating layers of Co (Cobalt) and Au (Gold), and the Co (Cobalt) serves as the sacrificial metal for galvanic displacement and the Au (Gold) becomes encapsulated by the coating of tellurium.

18. The nanostructure of claim 11, wherein the multi-segmented nanowire is comprised of alternating layers of Co (Cobalt) and Au (Gold), and the Co (Cobalt) serves as the sacrificial metal for the galvanic displacement reaction and the Au (Gold) becomes encapsulated by the coating of tellurium (Te).

* * * * *